US010861092B1

(12) United States Patent
Misra et al.

(10) Patent No.: US 10,861,092 B1
(45) Date of Patent: Dec. 8, 2020

(54) METHODS AND SYSTEMS FOR EFFICIENTLY RETRIEVING FINANCIAL DATA FOR FINANCIAL ACCOUNTS VIA A COMUNICATION NETWORK

(71) Applicant: INTUIT INC., Mountain View, CA (US)

(72) Inventors: Siddhartha Misra, San Jose, CA (US); Tarek Rabbani, Mountain View, CA (US); Nageswara Prasad Cherukuri, Fremont, CA (US); Kishore Nene, San Jose, CA (US); Neha Kumari, Newark, CA (US); Prateek Vasant Kakirwar, Newark, CA (US); Mahesh Subramanian, San Jose, CA (US)

(73) Assignee: INTUIT INC., Mountain View, CA (US)

(*) Notice: Subject to any disclaimer, the term of this patent is extended or adjusted under 35 U.S.C. 154(b) by 451 days.

(21) Appl. No.: 15/795,110

(22) Filed: Oct. 26, 2017

(51) Int. Cl.
| | |
|---|---|
| *G06Q 40/00* | (2012.01) |
| *G06Q 40/02* | (2012.01) |
| *G06F 21/31* | (2013.01) |
| *G06N 7/00* | (2006.01) |
| *G06Q 40/06* | (2012.01) |

(52) U.S. Cl.
CPC ........... *G06Q 40/02* (2013.01); *G06F 21/316* (2013.01); *G06N 7/005* (2013.01); *G06Q 40/06* (2013.01)

(58) Field of Classification Search
None
See application file for complete search history.

(56) References Cited

U.S. PATENT DOCUMENTS

| | | | | |
|---|---|---|---|---|
| 2013/0226784 | A1* | 8/2013 | He | G06Q 40/02 705/38 |
| 2013/0254079 | A1* | 9/2013 | Murali | G06Q 40/02 705/30 |
| 2015/0254783 | A1* | 9/2015 | Levin | G06Q 50/186 705/30 |
| 2016/0358259 | A1* | 12/2016 | Cucchiara | G06F 21/6245 |

* cited by examiner

*Primary Examiner* — Olabode Akintola
(74) *Attorney, Agent, or Firm* — DLA Piper LLP (US)

(57) ABSTRACT

Computerized systems and methods for efficiently refreshing financial data for financial accounts for login identifications of users at respective financial institutions in a batch data pull via a communication network. The login identifications are prioritized for being refreshed based on determining a probability that each login identification has a new transaction since the last successful refresh of the login identification using a learning algorithm utilizing past financial data. The login identifications are then refreshed in a batch data pull from the financial institutions in an order from highest probability to lowest probability of having a new transaction since the last batch data pull.

18 Claims, 13 Drawing Sheets

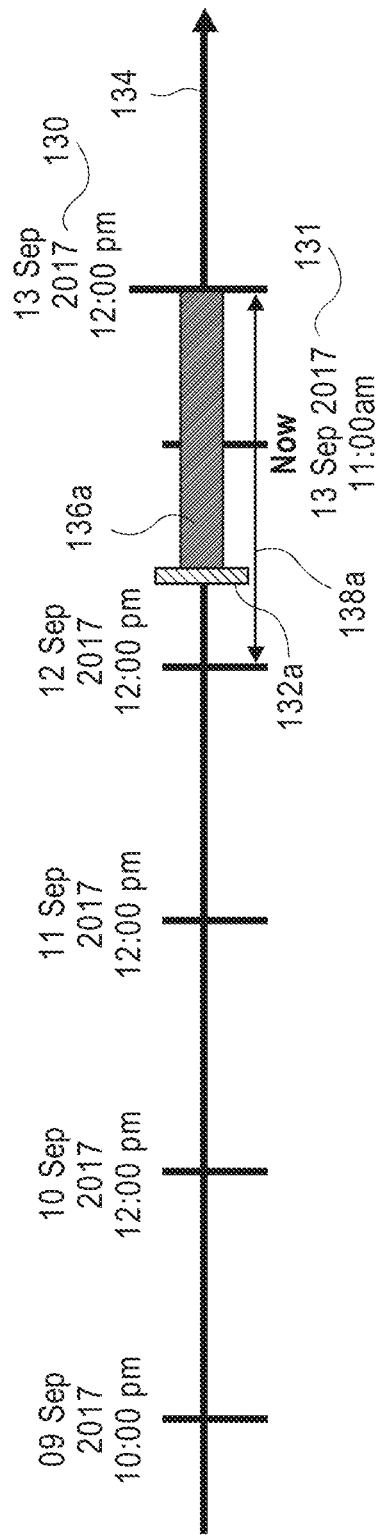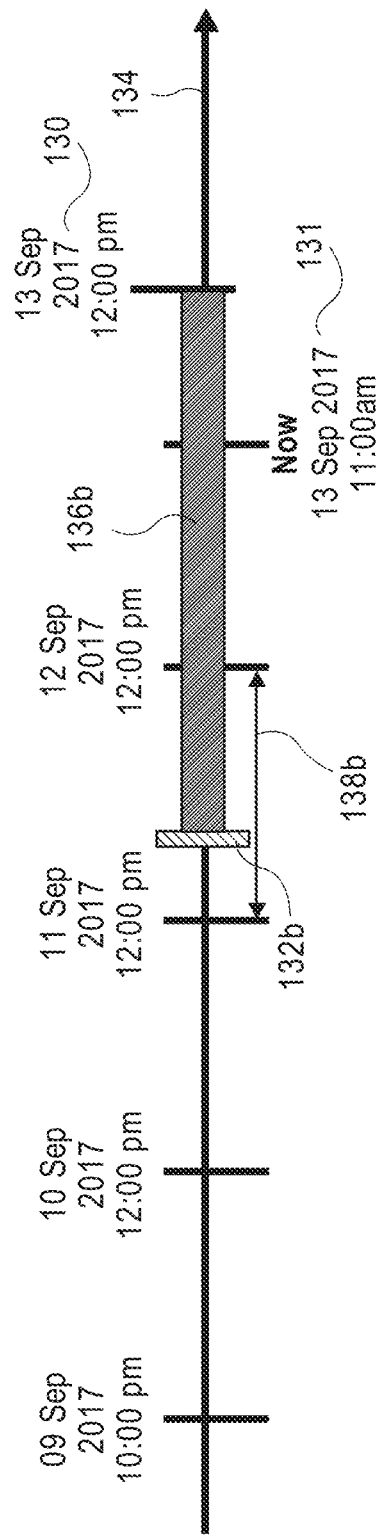

| | Second Label |
|---|---|
| | F |
| | T |

| Login ID | Fifth Data Time Period beforeLast_successfull_refresh | Fourth Data Time Period beforeLast_successfull_refresh | Third Data Time Period beforeLast_successfull_refresh | Second Data Time Period beforeLast_successfull_refresh | First Data Time Period beforeLast_successfull_refresh |
|---|---|---|---|---|---|
| 42346 | T | F | T | T | F |
| 25245 | F | T | T | F | T |

FIG. 12

METHODS AND SYSTEMS FOR EFFICIENTLY RETRIEVING FINANCIAL DATA FOR FINANCIAL ACCOUNTS VIA A COMUNICATION NETWORK

BACKGROUND

Embodiments of the present invention relate to methods and systems for retrieving financial data via a communication network, and more particularly, to new methods and systems for retrieving financial data for financial accounts of users in a prioritized manner which improves the efficiency of updating financial data and makes more efficient use of computer resources and communication network bandwidth.

Today, most financial institutions, such as banks, stock brokerages, lenders, credit card issuers and credit/debit card processors provide the account holders with online access to their accounts via each account holder's online account. The online account is typically accessible via the internet by logging into a website for the financial institution and entering a login identification and password. Hence, most financial data for financial accounts is accessible online such as through the internet and/or other communication network.

Many financial services beyond the financial institutions and account holders need to access financial data for the financial accounts in order to provide their services. For example, finance management services, accounting services, tax return preparation services and the like (referred to collectively as "financial services providers" need to access financial account data to provide their respective services.

For instance, personal finance management applications, such as the MINT® website (provided by Intuit Inc., Mountain View, Calif.) and Quicken®, utilize banking, financial and billing data from banks, companies, and financial institutions in order to provide personal finance management services. With this financial data, the personal finance management website allows a user to organize and track accounts and activity at multiple financial institutions. Such personal finance services can perform financial management functions such as managing bills and providing reminders to pay bills, tracking and managing investments, performing budgeting tasks, viewing and printing summaries and reports, preparing and printing expense reports, and writing checks. Similarly, accounting applications, such as Quickbooks® (online or desktop, provided by Intuit Inc., Mountain View, Calif.), need to access financial data such as bank account balances and bank transactions, investment data, loan data, etc. The accounting application uses this financial data to perform accounting functions, including generating invoices, tracking receivables and payments, managing and paying bills, as well as generate accounting reports such as profit and loss reports, etc. In addition, tax preparation applications, such as Turbotax® (online or desktop, provided by Intuit Inc., Mountain View, Calif.) utilize financial data from financial institutions for preparing and filing a tax return for a taxpayer.

Furthermore, many of the services provided by these financial services providers need to update (also referred to as "refresh") the financial data for the financial accounts because the financial data changes over time. For instance, over time, financial accounts will have new transactions, new or changed account information, new balances, or changes to previous transactions and information. In addition, a user (or a user's login identification) may have a new account, transferred account or closed account. Hence, the financial services provider needs to refresh the financial data to keep the data current, in order to maintain the financial services up to date and accurate.

Instead of requiring users to manually input all of the financial data, or even requiring the user to upload financial data from their financial accounts, many such financial services providers allow user to link their online accounts to their financial services account with the financial services providers. To link the online accounts, the financial services providers obtain login credentials and permission from their users to access and download the financial data for the financial accounts (also referred to as "pulling" the financial data) automatically without the user providing any additional permission or login information.

Financial services providers may utilize various methods to pull the financial data. For one, the financial services providers may pull the data each time a user logs in and/or accesses the financial services from the financial services provider. This is often called an "online data pull" which is initiated by an "online trigger" when the user logs into their online account. The online data trigger initiates a comprehensive data pull from all of the user's linked login identifications. However, online data pulls are expensive and inefficient because it requires making a new connection to the financial institution (as financial institutions do not allow keeping a continuous connection for online data pulls) and a new authentication for each online trigger. This process is expensive and inefficient because it utilizes more computing resources and more network bandwidth than a "batch data pull," as described next. Another type of data pull is a "batch data pull," also called a "batch data refresh." In a batch data refresh, the financial services provider "batches" (i.e., groups or aggregates) the login identifications for each respective financial institution and pulls the data for all of the login identifications for each respective financial institution in a batch, i.e., in the same network connection(s). In other words, the financial data for all of the login identifications at one particular financial institution are pulled in the same network connection(s). The financial services provider does the batch data pull for each of the financial institutions which user have linked. The batch data pull for each financial institution is typically performed on a periodic basis, such as once a day, or every other day. The batch data pull is far more efficient than the online data pull because it may not require establishing new connections and new authentications for each login identification at the particular financial institution, thereby using less computing resources and less network bandwidth.

However, the batch data pull also has a number of drawbacks. For one, a financial services provider may have millions of accounts to do a batch data refresh and it may not be possible to refresh them all on the desired periodic basis due to computing resource and bandwidth constraints. In addition, some financial institutions, especially smaller banks, complain about the excessive network traffic received from some of the financial services providers in doing batch data refreshes. Furthermore, some financial institutions throttle the traffic from financial services providers, such as by allowing a batch data pull on a limited number of accounts each day, reducing the network connection speed, restricting batch data pulls to particular times or day(s) of the week, etc.

Accordingly, there is a need for an improved process and system for pulling financial data for user's accounts which overcomes these drawbacks while also pulling the financial data needed to keep the financial data up to date.

SUMMARY

Embodiments of the present invention are directed to methods and systems for refreshing financial data for financial accounts of a plurality of users via a communication network in an improved, more efficient manner, while still maintaining the financial data up to date. The invention is useful in any application in which data for a plurality of accounts is pulled via a communication network, such as refreshing financial data for financial accounts of users being pulled by financial services providers.

One embodiment of the present invention is directed to a computer-implemented method for retrieving financial data for financial accounts of users via a communication network using each user's online login identifications for the financial accounts. Typically, the method is implemented on a financial services system including a computer server having one or more computer processors, memory, a data store/storage device having a database storing a plurality of online login credentials for a plurality of users of the financial services provider, and a financial data retrieval software application. The financial data retrieval software application may be a standalone application, or it may be integrated with other software and/or applications. The financial services system is configured to be in network communication with a plurality of financial data systems of financial institutions via a communication network which may include the internet, public network, private network, or any combination thereof. The financial services system is configured to execute the financial data retrieval software application to perform a process for pulling data from the financial institutions in a prioritized manner which improves the efficiency of refreshing the financial data utilized by the financial services system.

The financial services system may be an online system such that computer server comprises, or is in operable communication with, a website server which provides a website accessible by user to utilize the online services provided by the financial services provider, or it may be a local, standalone system operating a local computer which can communicate with the financial data systems of financial institutions via a communication network. The communication network may include the internet, public networks, private networks, or any combination thereof.

The method of refreshing financial data includes storing a plurality of login identifications for financial accounts of users at in the database. For instance, the users may link the financial accounts to a financial services account with the financial services provider by providing their respective online login credentials for the financial accounts, including the login identification (e.g., a username), and password. The linking may also require an explicit authorization for the financial services provider to pull financial data from the financial account.

The financial services system generally determines a last successful data retrieval time for each online login identification. This may be done by entering a record for each login identification with the date of a data retrieval when the financial data for the respective login identification is refreshed. Then, the system trains a plurality of predictive models, wherein each predictive model is associated with a different model selection time period. The plurality of model selection time periods is designed such that each of the last successful data retrieval times will correspond with one of the model selection time periods. Each of the predictive models may be a Random Forest Machine Learning algorithm or other suitable predictive model algorithm. The last successful data retrieval time may be a particular time (as used herein, the term "time" is used broadly and does not refer only to a time of day, but can refer to day, time and day, etc.). For instance, the plurality of predictive models may include a first predictive model for a last successful data retrieval time of one day before the data retrieval, a second predictive model for a last successful retrieval time period of two days before the data refresh, a third predictive model for a last successful retrieval time period of three days, and so on for a predetermined number of total days, and a catchall predictive model for a last successful retrieval time period exceeding the predetermined number of total days. The plurality of predictive models is trained using the following process:

a. each online login identification is assigned to a respective predictive model having a last successful retrieval time period matching the last successful retrieval time period associated with the predictive model;

b. then, for each of the plurality of predictive models, i. financial data is accessed from the database for each of the online login identifications assigned to the respective predictive model for a plurality of data time periods prior to the last successful retrieval time;

ii. a respective model training set of data is generated by determining whether there was a new transaction in each of the plurality of data time periods for each respective online login identification assigned to the respective predictive model using the financial data;

iii. the respective predictive model is trained by inputting the respective model training set into a respective learning algorithm for the respective predictive model.

Once the predictive models are trained, the system determines a probability score for each online login identification that such online login identification has a new transaction since the last successful retrieval data retrieval time period by inputting the respective determination of whether there was a new transaction in each of the plurality of data time periods for each respective online login identification into the predictive model assigned to the online login identification. The probability scores can then be used to prioritize the online login identifications for refreshing the financial data. For example, the online login identification can be sorted based on the probability scores from higher probability of having a new transaction to lower probability of having a new transaction since the last successful retrieval data retrieval time period Then, the system retrieves data (i.e., refreshes the data) for a plurality of the online login identifications via an online connection in an order of the probability scores from higher probability of having a new transaction to lower probability of having a new transaction since the last successful retrieval data retrieval time period. In this way, those login identifications having the highest probability of having new transactions are refreshed first, and those with lower probabilities are sorted after. In the case that a financial institution restricts traffic for pulling data, the login identifications most likely to have new transactions will be refreshed, while those less likely to have new transactions may not be refreshed.

In another aspect, the method may be configured to only refresh a predetermined range of the login identifications, such as only the 90%, 80%, 70%, 60%, 50%, 40%, 30%, 25%, 20%, 15% of the login identifications with the highest probability scores, or less than 70%, less than 60% or less than 50% of the total number of online login identifications. By analyzing the data, it has been determined that within certain time periods between refreshing the financial data for a plurality of login identifications, at least some of the accounts will not have new transactions such that they do not need to be refreshed in order to have current financial data. It has also been determined that certain types of financial accounts are less likely to have new transactions within certain time periods. For instance, savings accounts are less likely to have new transactions than checking accounts and credit card accounts within the same time period. Similarly, retirement accounts rarely have new transactions on a daily, or weekly basis, but instead perhaps once per month.

By prioritizing the login identifications to be refreshed in a batch data pull, the method of the present invention is more efficient than refreshing all financial accounts in a random or non-prioritized manner because it reduces the amount of computing resources and network bandwidth required to ensure that most, if not all, of the financial data for the linked financial accounts is current at the time a user logs in to utilize the financial services provided by the financial services provider. Said another way, the method avoids wasting computing resources and network bandwidth on refreshing financial data for financial accounts that do not need to be refreshed because there are no new transactions in those financial accounts such that the data pulled in the last successful data retrieval is current and accurate.

In another aspect of the present invention, the data time periods are days and the plurality of data time periods is a plurality of consecutive days. The term "consecutive days" means consecutive days in which a financial institution is active to post new transactions to financial accounts. For example, if a financial institution does not post new transactions on Sundays, then a Sunday would not constitute a break in consecutive days. In still other aspects of the present invention, the plurality of consecutive days may be 30 days, 60 days, 90 days, at least 30 days, at least 60 days, at least 90 days.

Another embodiment of the present is directed to the system for retrieving financial data for a plurality of financial accounts. As described above, the system includes a computer server having a computer processor, a data store storing financial data for a plurality of financial accounts for a plurality of users and a plurality of online login identifications for the financial account for the users, a network communication interface, and a financial data retrieval software application, the computer server in communication with a plurality of financial institutions via a communication network. The financial data retrieval software application is configured to program the computer to perform the method of refreshing financial data for financial accounts as described above.

In additional aspects of the present invention, the system embodiment may also include the additional aspects of the method as described above.

Accordingly, the system and methods of the present invention provides a technological improvement in retrieving financial data from financial institutions for a plurality of online login identifications linked to a financial services account. The present invention reduces the computing resources and network bandwidth required to keep the financial data for the financial accounts refreshed and current. The present invention also effects an improvement in computer-related technology, computer networking technology, and database technology by improving the efficiency in the use of computing power and network bandwidth while also maintaining the data in the database for most or all of the accounts up to date. Moreover, the technological improvement also can be applied to other technologies and technical fields beyond refreshing financial data such as refreshing other types of data like education related data, employments records, government program services, etc., by utilizing the systems and method of prioritizing accounts and batch data pulling the data based on the prioritization.

BRIEF DESCRIPTION OF THE DRAWINGS

The foregoing and other aspects of embodiments are described in further detail with reference to the accompanying drawings, wherein:

FIGS. 5-13 are diagrams illustrating the steps in the process for training each of the plurality of predictive models in the process shown in FIG. 4, according to one embodiment of the present invention;

DETAILED DESCRIPTION OF ILLUSTRATED EMBODIMENTS

Embodiments of the present invention are directed to computerized systems and methods for efficiently retrieving financial data for financial accounts of users at respective financial institutions in a batch data pull via a communication network. The present invention utilizes an innovative process for prioritizing login identifications for the financial accounts based on a probability score that the financial accounts for the login identifications have a new transaction since a last successful retrieval time period in which the financial data for the financial accounts was successfully retrieved (i.e., refreshed). Each of the login identifications is assigned to a respective predictive model associated with a model selection time period which matches the last successful data retrieval time. Each of the predictive models is then trained past transaction data indicating when past transactions occurred in each of the login identifications assigned to the respective predictive model. After training each of the predictive models, a probability score that the respective login identification has a new transaction since the respective last successful data retrieval time is determined for each login identification by inputting the respective past transaction data into the predictive model assigned to the login identification. Finally, financial data is retrieved via an online connection to the financial institutions for a predetermined portion of the plurality of the login identifications having the highest probability in an order of the probability scores. The systems and methods of the present invention provide an increased likelihood that data pulled in a batch data pull process is pulled predominantly for accounts with higher levels of activity. This also results in decreased processing time relative to batch data pulling the financial data for the login identifications in a random order, or utilizing "dumb" or "greedy" algorithms. The systems and methods of the present invention also increase the likelihood that a larger percentage of login identifications are current and up-to-date when including less than all of the login identifications in each batch data pull, as compared to batch data pulling the login identifications in a random order. Furthermore, by batch data pulling only those login identifications having a high probability of new transactions, the systems and methods of the present invention reduce the computing resources and network bandwidth required to keep all, or most, of the login identifications current and up-to-date at any given time. Accordingly, the present invention effects an improvement in computer-related technology, computer networking technology, and database technology by improving the efficiency in the use of computing power and network bandwidth while also maintaining the data in the database refreshed for a higher percentage of the total accounts as compared to batch data pulling the accounts in a random order.

Figure 1:
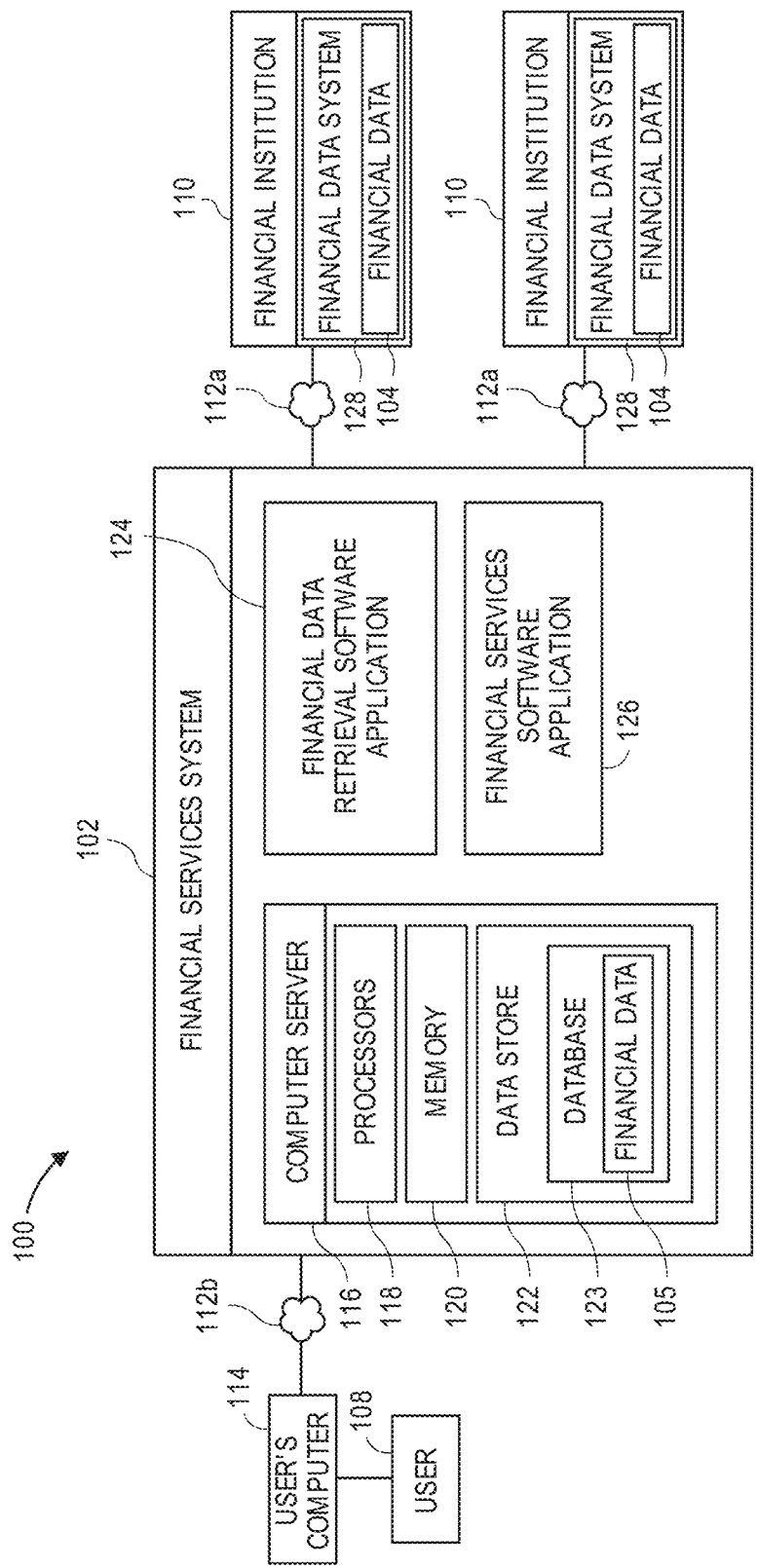
FIG. 1 illustrates a system having a financial services system for efficiently retrieving financial data for financial accounts of users via a communication network, according to one embodiment of the present invention.

Referring to FIG. 1, in one embodiment, a system 100 having a financial services system 102 for efficiently retrieving financial data 104 for financial accounts of users 108 from financial institutions 110 via a communication network 112a is shown. The system 100 comprises a financial services system 102 which can communicate with a plurality of financial institutions 110 via the communication network 112a. The financial services system 102 is also accessible by a user 108 having an account on the financial services system 102 using the user's computing device 114. The user's computing device 114 may be any suitable computer, such as a personal computer, tablet computer, smartphone or the like. The user's computing device 114 accesses and utilizes the financial services provided by the financial services system 114 through a communication network 112b. For example, the user's computing device 114 may utilize the financial services provided by the financial services system 114 using a web browser on the user's computing device 114, or an application (app) installed and executing on the user's computing device.

The financial services system 102 includes a computer server 116 having one or more computer processors 118, memory 120, a data store/storage device 122 having a database 123 of stored financial data 105, and a financial data retrieval software application 124. The database stores financial data for the each of the user's financial services accounts. The computer server 116 may comprise a single system or server, or multiple systems or servers working together to deliver financial services. The stored financial data 105 in the database 123 includes financial data for each of the financial services accounts of the users/customers of the financial services provider that provides the financial services provided by the financial services system 102. The stored financial data 105 for each user's financial services account includes financial data for the user's financial accounts at financial institutions. The database 123 also stores the login credentials for each of the users for the financial accounts at the financial institutions. The financial services system 102 obtains the login credentials for the financial accounts of each of the user's when a user links the financial accounts at financial institutions 110 with their respective financial services account. For instance, the users link the financial accounts at financial institutions 110 to their respective financial services accounts by providing their respective online login credentials for the financial accounts, including the login identification (e.g., a username), and password. The linking may also require an explicit authorization for the financial services provider to pull financial data 104 from the financial account at the financial institution 110.

The financial data retrieval software application 124 may be a standalone application, or it may be integrated with the financial services software application 126 and/or other software and/or applications. The financial services system 102 can communicate with the financial data systems 128 of the financial institutions 110 via the communication network 112a.

The financial services system 102 may be an online system such that computer server 116 comprises, or is in operable communication with, a website server which provides a website accessible by user to utilize the online services provided by the financial services provider, or it may be a local, standalone system operating a local computer which can communicate with the financial data systems 128 of the financial institutions 110 via the communication network 112a. The communication network may include the internet, public networks, private networks, or any combination thereof.

Figure 2:
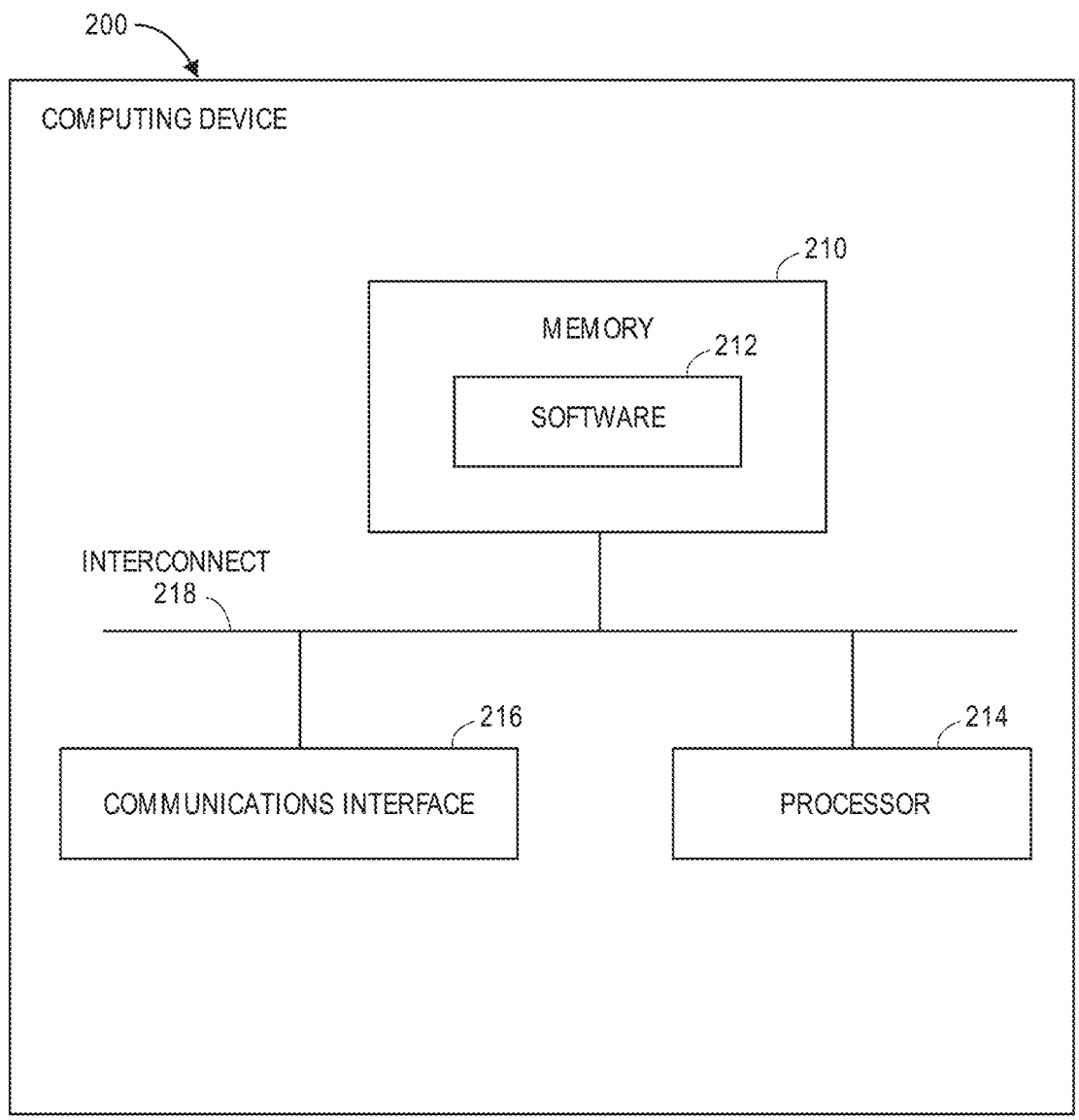
FIG. 2 is a block diagram of a computing device which may be utilized as the computers and computer server in the system of FIG. 1, according to one embodiment of the present invention.

FIG. 2 is a block diagram of the components of an example of a computer (computing device) 200 that may be used as the computer in the computers 114 and computer server 116 identified in the system 100 of FIG. 1. The computer 200 includes a memory 210, application software 212, a processor or controller 214 to execute the application software 212, and a network or communications interface 216, e.g., for communications with a network or interconnect 218 between the components. The memory 210 may be, or include, one or more of cache, RAM, ROM, SRAM, DRAM, RDRAM, EEPROM, SDRAM and other types of volatile or non-volatile memory capable of storing data. The processor 214 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 218 may include a system bus, LDT, PCI, ISA, or other types of buses, and the communications or network interface may, for example, be an Ethernet interface, a Frame Relay interface, or other interface. The network interface 216 may be configured to enable a system component to communicate with other system components across a network which may be a wireless network or various other communication networks. It should be noted that one or more components of computing device 200 may be located remotely and accessed via a network. Accordingly, the system configuration provided in FIG. 2 is provided to generally illustrate how embodiments may be configured and implemented.

Furthermore, each of the communication networks 112 (a)-(b) may include a proprietary network, LAN, WAN, cellular network, wireless network, the internet and/or other suitable network.

The financial services system 102 is configured to execute the financial data retrieval software application 124 on the computer server 116 to perform a process for pulling financial data 104 from the financial data systems 128 of the financial institutions 110 in a prioritized manner which improves the efficiency of refreshing the stored financial data 105 by batch data pulling the financial data 104 from the financial institutions 110 in order to ensure the financial data 104 used by the financial services system 102 to provide financial services to the users 108 is current and accurate.

Turning to FIG. 2, in one embodiment, a computerized method 300 for refreshing financial data 105 for the financial accounts of users 108 via a communication network 112*a* using the financial services system 102 is shown. At step 302 of the method 300, the financial services system 102 stores a plurality of login identifications for financial accounts of users in the database 123. As described herein, the users 108 link their financial accounts at financial institutions 110 to a financial services account with the financial services system 102 by providing their respective online login credentials for the financial accounts, including the login identification (e.g., a username), and password. The users may also need to authorize the financial services provider to pull financial data from the financial accounts, such as by electronically agreeing to a financial account access agreement. The financial data 105 is stored in any suitable database, and may be refreshed in any suitable manner, including adding refreshed data to the database, and/or overwriting obsolete data, or other suitable manner.

At step 304, the financial services system 102 determines a last successful data retrieval time for each online login identification. The last successful data retrieval time is a time at which the financial data 105 was last successfully refreshed by retrieving financial data 104 from the financial institutions 110 for the respective login identification. The financial services system 102 may determine the last successful data retrieval time for each login identification by entering a record for each login identification with the date of a data retrieval when the financial data for the respective login identification is refreshed. The last successful retrieval time may be a particular time or a period of time (as used herein, the term "time" is used broadly and does not refer only to a time of day, but can refer to day, time and day, etc.). FIG. 5 shows a timeline 134 illustrating a last successful data retrieval time 132*a* for an exemplary first login identification. As shown in FIG. 5, the current time 131 is Sep. 13, 2017, at 11:00 am and the financial services system 102 is preparing a next batch data pull 130 to be performed on Sep. 13, 2017 at 12:00 pm. For the first login identification shown in FIG. 5, the last successful data retrieval time 132 was Sep. 11, 2017 at 12:00 am.

Still referring to FIG. 5, the timeline 134 illustrates the prediction time period 136*a* for which the financial services system 102 needs to predict the probability that the financial accounts for the first login identification will have a new transaction such that the first login identification needs to be refreshed on the next batch data pull 130 in order to be current at the time of the batch data pull 130. As shown in FIG. 5, the prediction time period 136*a* is from the last successful data retrieval time 132*a*, September 12, at 5:00 pm, to the next batch data pull 130 to be performed on Sep. 13, 2017 at 12:00 pm.

FIG. 6 shows a timeline 134 illustrating a last successful data retrieval time 132*b* for an exemplary second login identification for the same next batch data pull 130 as in FIG. 5. For the second login identification shown in FIG. 6, the last successful data retrieval time 132*b* was Sep. 11, 2017 at 5:00 pm. FIG. 6 also shows that the prediction time period 136*b* is the period of time from September 11, at 5:00 pm to the time of next batch data pull 130 to be performed on Sep. 13, 2017 at 12:00 pm.

Figure 7:
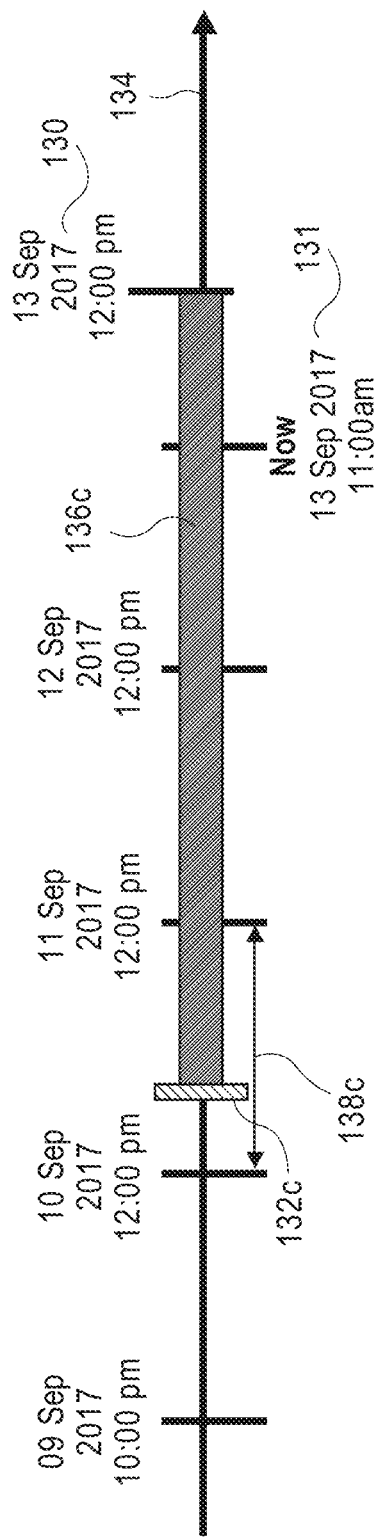

FIG. 7 shows a timeline 134 illustrating a last successful data retrieval time 132*c* for an exemplary third login identification for the same next batch data pull 130 as in FIGS. 5-6. For the third login identification shown in FIG. 7, the last successful data retrieval time 132*c* was Sep. 10, 2017 at 5:00 pm. FIG. 7 also shows that the model selection time period 136*c* is the period of time from September 10, at 5:00 pm to the time of next batch data pull 130 to be performed on Sep. 13, 2017 at 12:00 pm.

In this example case, the last successful data retrieval time 132*c* for three different login identifications was illustrated. It is understood that the method 300 may be performed for any number of login identifications.

Then, at step 306, the financial services system 102 trains a plurality of predictive models, wherein each predictive model is associated with a different model selection time period 138. The predictive models are trained to determine a probability score that the new transaction occurred during a prediction time period of a respective login identification using past financial data for the respective login identification. The predictive models may be Random Forest Machine Learning algorithms, or other suitable predictive models. The plurality of model selection time periods 138 are designed such that each of the last successful data retrieval times 132 for the login identifications will correspond with (i.e., occur during) one of the model selection time periods 138.

As shown in in FIGS. 5-7, each of the model selection time periods 138*a*, 138*b*, and 138*c* are a period of time before the next batch data pull 130. The model selection time periods 138 in the illustrated examples are a one-day period, i.e., a 24-hour period from 12:00 pm on one day to 12:00 pm on the following day. More specifically, as shown in FIG. 5, the model selection time period 138*a* for a first predictive model is the 24-hour period before the next batch data pull 130, which in the illustrated example is from Sep. 12, 2017 at 12:00 pm to Sep. 13, 2017 at 12:00 pm. As shown in FIG. 5, a first model selection time period 138*a* for a first predictive model is the 24-hour period ending at the time of the next batch data pull 130, which in the illustrated example is from Sep. 12, 2017 at 12:00 pm to Sep. 13, 2017 at 12:00 pm.

As shown in FIG. 6, a second model selection time period 138*b* for a second predictive model is the 24-hour period (the day) before the first model selection time period 138*a*, i.e., a 24-hour period that ends one day before the next batch data pull 130, which in the illustrated example is from Sep. 11, 2017 at 12:00 pm to Sep. 12, 2017 at 12:00 pm.

As shown in FIG. 7, a third model selection time period 138*c* for a third predictive model is the 24-hour period (the day) before the second model selection time period 138*b*, i.e., a 24-hour period that ends two days before the next batch data pull 130, which in the illustrated example is from Sep. 10, 2017 at 12:00 pm to Sep. 11, 2017 at 12:00 pm.

It is understood that the model selection time period is not limited to a 24-hour period, but may be any suitable time period, such as 12 hours, 2 days, 3 days, 4 days, etc. It is also understood that there may be any suitable number of model selection time periods 138, such as N model selection time periods 138 associated with N respective predictive models, depending on how many models may be required in order to ensure that all login identifications will be refreshed. In another way, there may be a predetermined number of predictive models each having a respective model selection time period 138, such as 7, 10, 15 or 30, which cover a period of time before the next batch data pull 130, such as 7 days, 10 days, 15 days or 30 days, and a catchall predictive model 138 which covers the time period cover all time before the earliest model selection time period 138. For example, the financial services system 102 may be configured to give a highest probability score to login identifications having a last successful data retrieval time that occurred during the catchall time period, i.e., occurring before the earliest model selection time period 138.

Figure 4:
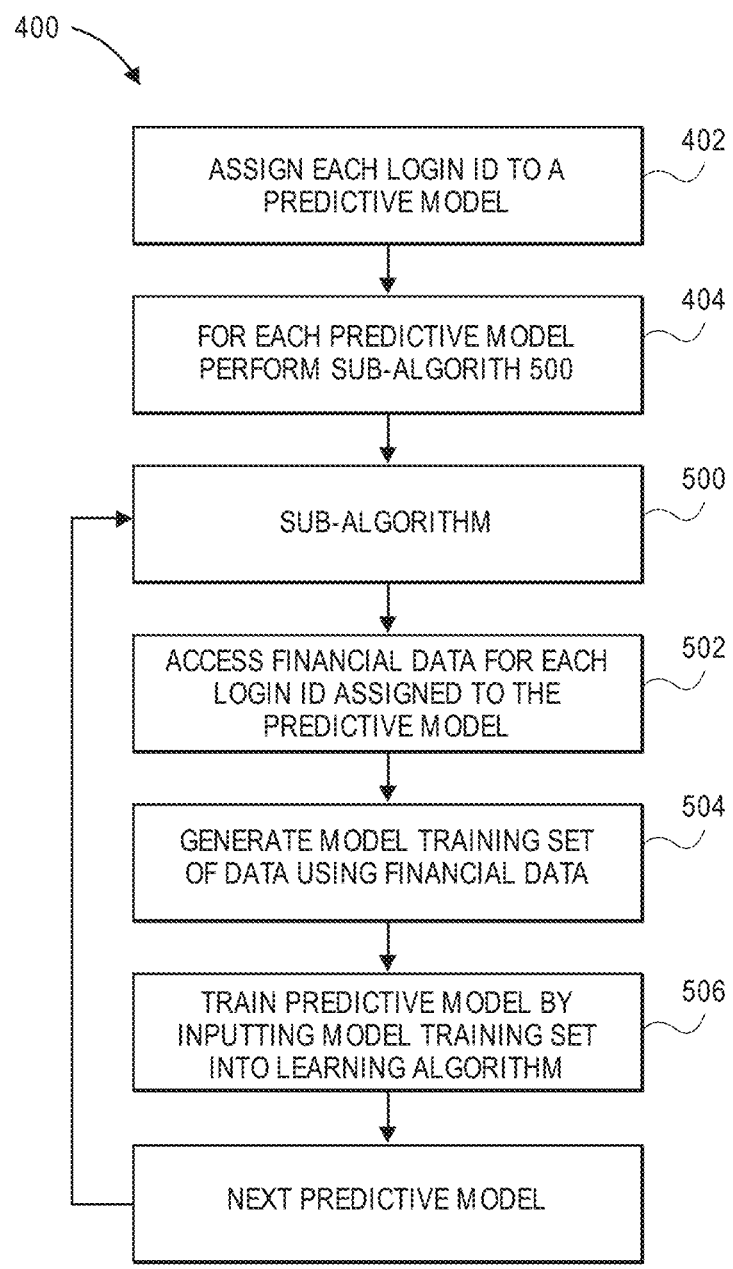
FIG. 4 is a flow chart of the process for training a plurality of predictive models within the method for efficiently performing a batch data pull to retrieve financial data in a financial services system shown in FIG. 3, according to one embodiment of the present invention.

The plurality of model selection time periods 138 are designed such that each of the last successful data retrieval times for the login identifications will correspond with one of the model selection time periods. Turning to FIG. 4, an algorithm/process 400 for training the predictive models is shown. At step 402 of the algorithm 400, each online login identification is assigned to a respective predictive model having a last successful retrieval time period 138 corresponding to the model selection time period 138 for the respective assigned predictive model. In the examples of FIGS. 5-7, the first login identification is assigned to the first predictive model because the last successful retrieval time 138*a* occurs during the first model selection time period 138*a* for the first predictive model. Similarly, the second login identification is assigned to the second login identification because the last successful retrieval time 138*b* occurs during the second model selection time period 138*b* for the second predictive model, and the third login identification is assigned to the third login identification because the last successful retrieval time 138*c* occurs during the third model selection time period 138*c* for the third predictive model.

Figure 8:
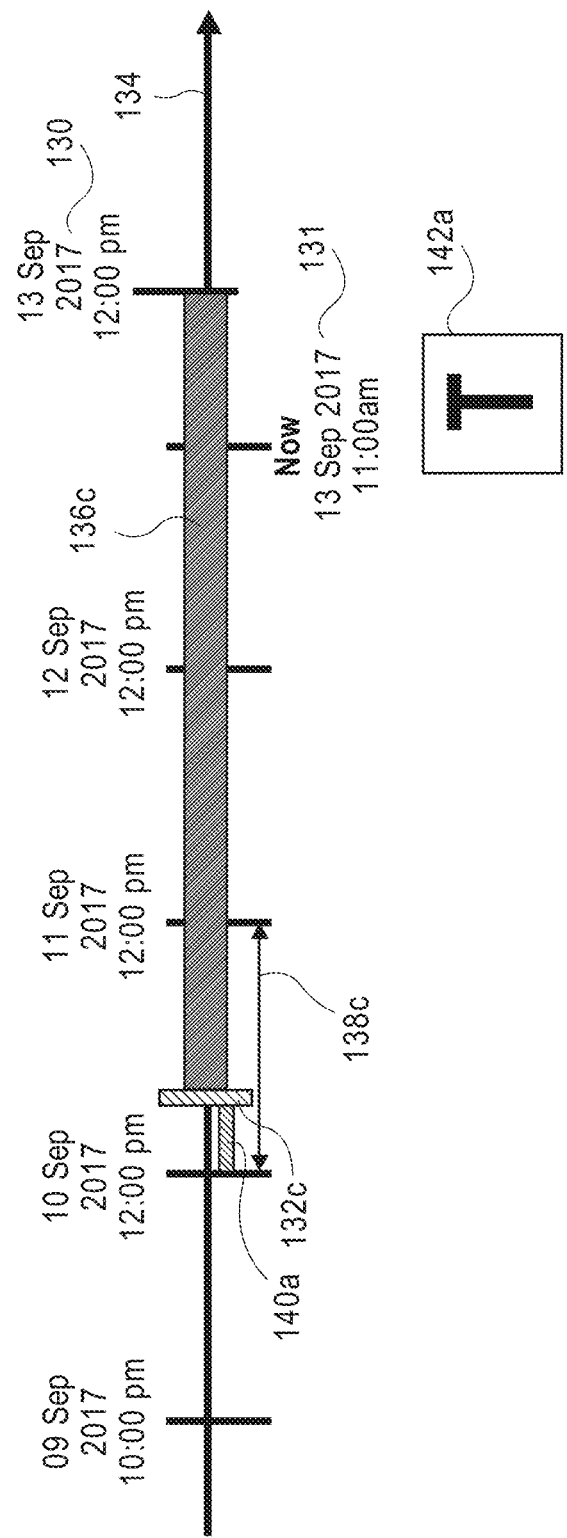
Figure 9:
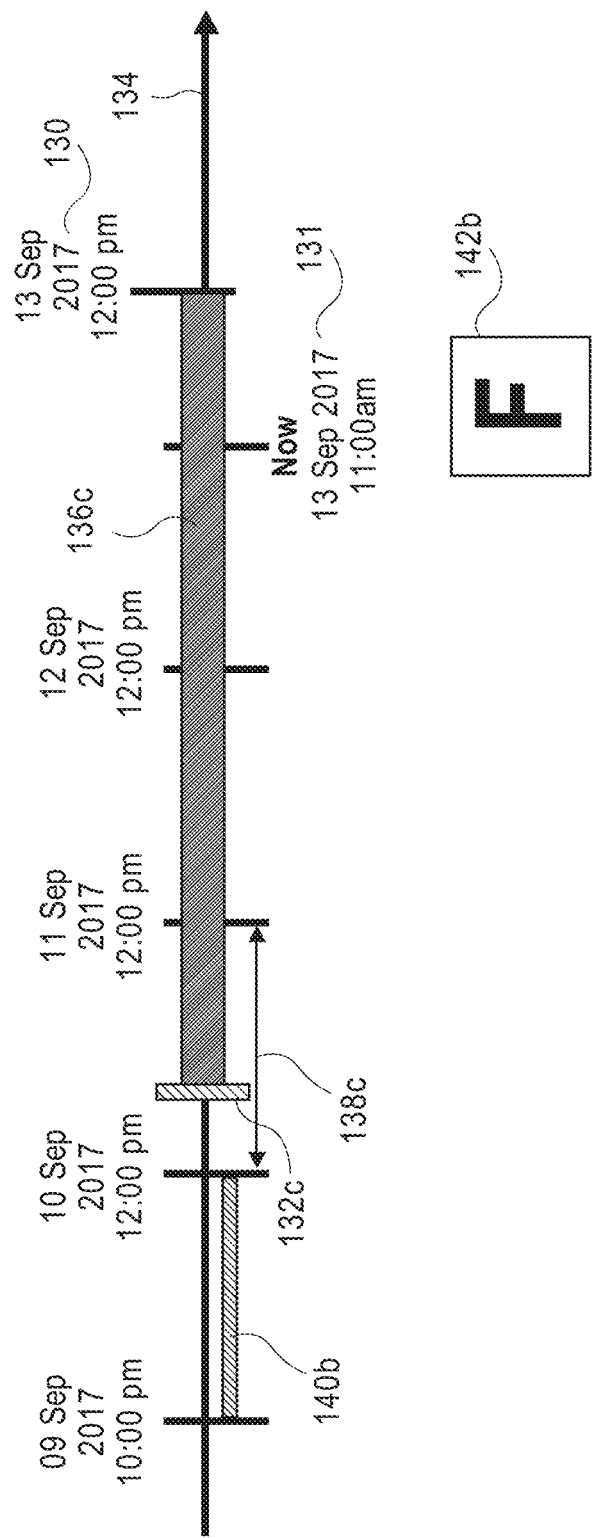

Next, at step 404, for each of the plurality of predictive models, sub-algorithm 500 is performed. At step 502, the financial services system 102 accesses financial data from the database for each of the online login identifications assigned to the respective predictive model for a plurality of data time periods prior to the last successful retrieval time 132 for each of the respective login identifications. The data time periods may be a one-day period, a week period, a half day period, or other suitable time period. Referring now to FIGS. 8 and 9, a first data time period 140*a* and a second data time period 140*b* for the exemplary third login identification shown in FIG. 7 are shown. Financial data for N data time periods prior to the last successful retrieval time period 132 for each login identification assigned to the third login identification is accessed from the database.

Figure 10:
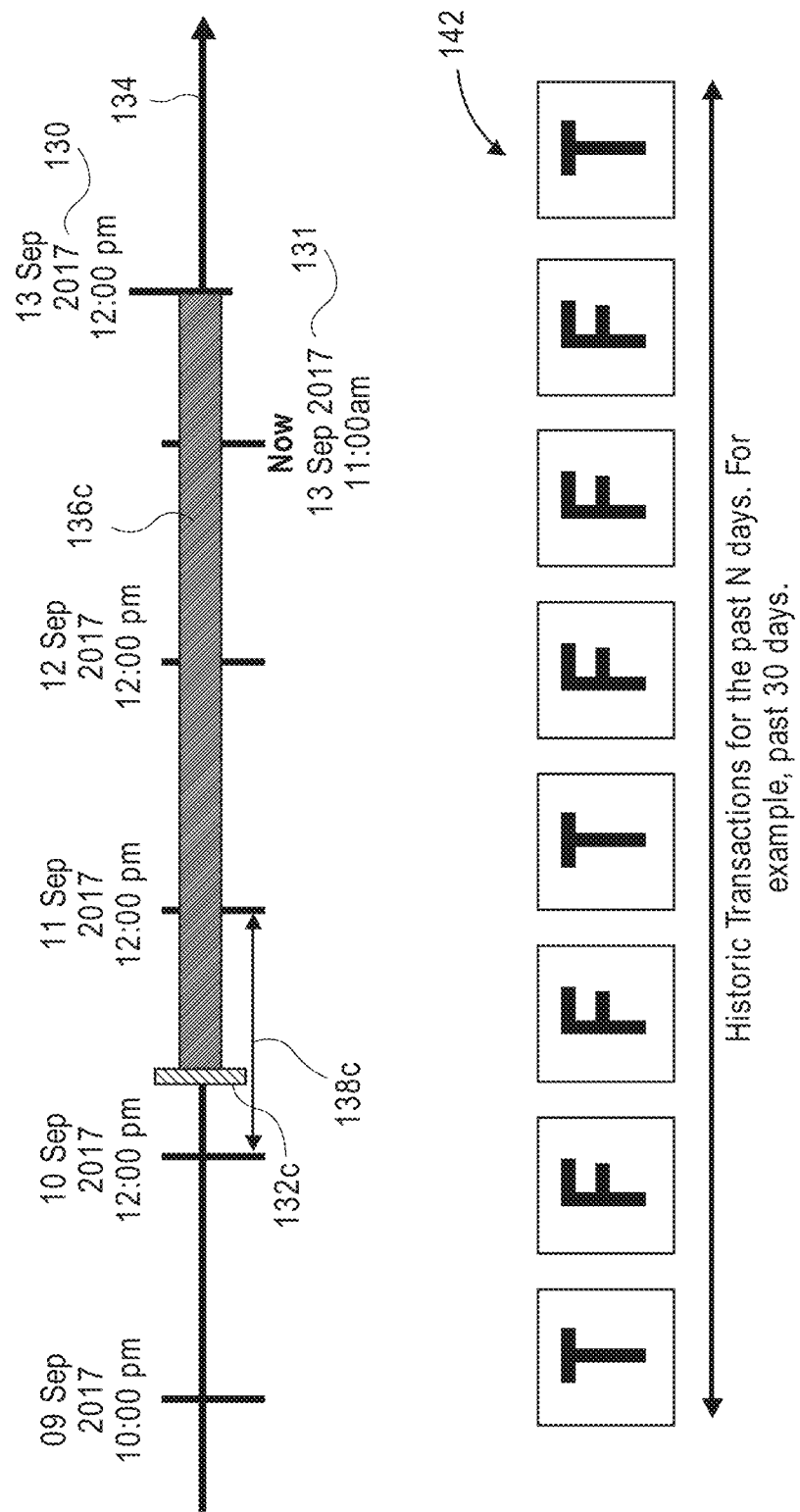
Figure 11:
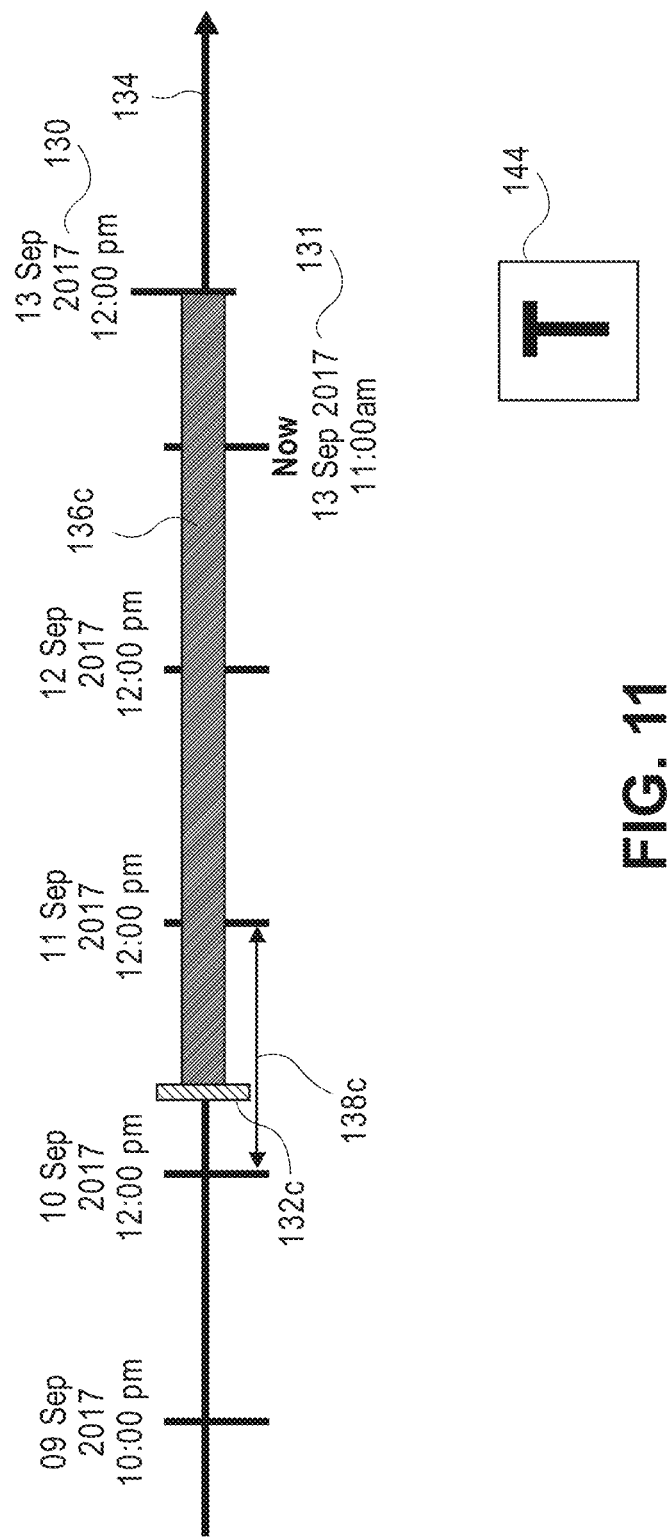

At step 504, the financial services system 102 generates a respective model training set of data by determining whether there was a new transaction in each of the plurality of data time periods 140 for each respective online login identifications assigned to the respective predictive model using the financial data. As shown in the example of FIG. 8, there was a new transaction in the first time period 140*a*, and a first label 142*a* "T" for true (indicating a new transaction) is recorded for the first time period for the respective login identification. As shown in FIG. 9, there was not a new transaction in the second time period 140*b*, and a first label 142*b* "F" for false (indicating no new transaction) is recorded for the second time period for the respective login identification. This is repeated for the N time periods, as depicted in FIG. 10 which illustrates the labeled data set for 30 days. For each login identification assigned to the respective predictive model, it is also determined whether there was a new transaction during the prediction time period 136*c* using the financial data. The system 102 may determine that there was a new transaction by analyzing each of the transaction dates in the financial data 104 and determining whether any of the transaction dates occurs after the respective last successful data retrieval time for the respective login identification. As shown in FIG. 11, in the example for third login identification and third predictive model depicted in FIGS. 7-10, there is a new transaction in the prediction time period 136*c* and a second label 144 "T" is recorded for the third login identification. The second label indicates whether there was a transaction in the account during the prediction time period 136*c*. This is repeated for each of the login identifications thereby generating a labeled data set of first labels 142 and second labels 144 for each of the login identifications assigned to the respective predictive model. FIG. 12 depicts a labeled data set for training the third predictive model shown in FIGS. 7-11.

At step 506, the respective predictive model is trained by inputting the respective model training set into a respective learning algorithm for the respective predictive model. The learning algorithm corresponds to the particular predictive model being utilized by the financial services system 102, such as a Random Forest Machine Learning algorithm, or other suitable algorithm.

Figure 3:
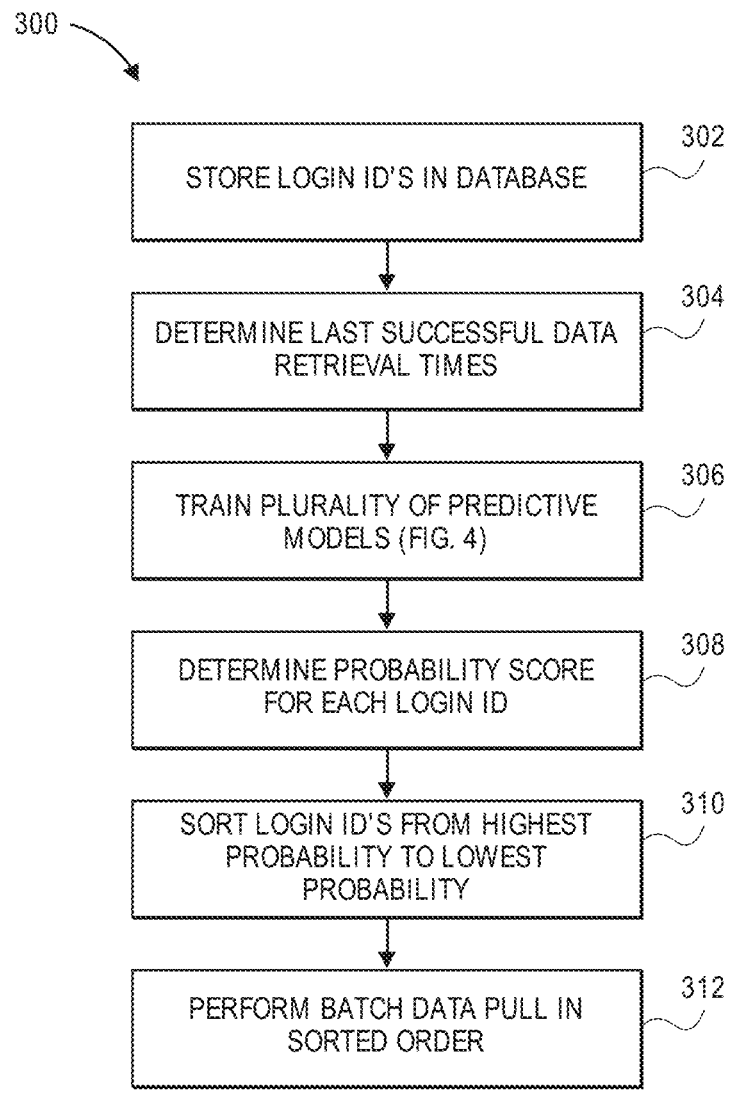
FIG. 3 is a flow chart of a method for efficiently performing a batch data pull to retrieve financial data in a financial services system, according to one embodiment of the present invention.
Figure 13:
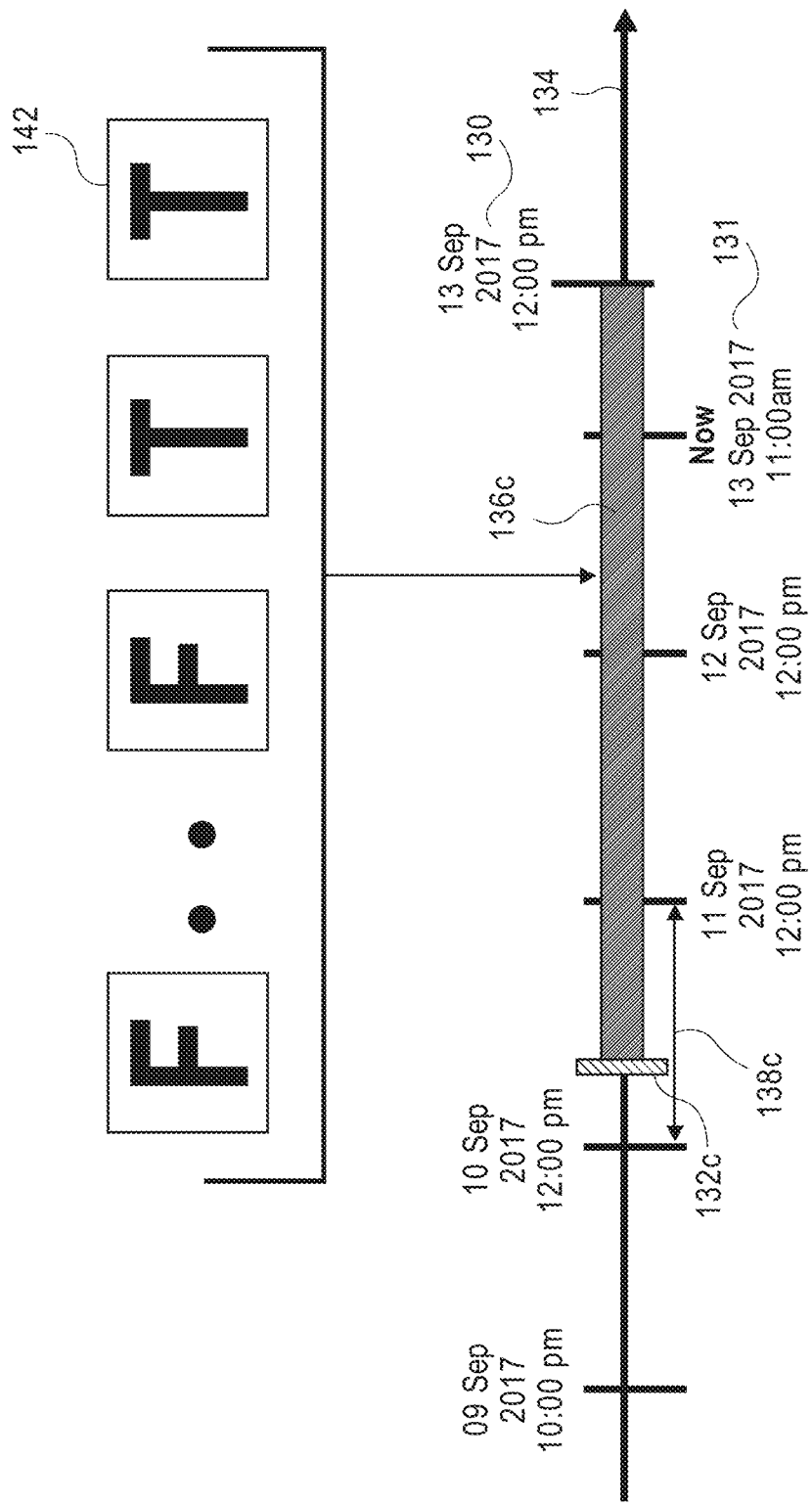

Turning back to FIG. 3, after the predictive models are trained, at step 308, the financial services system 102 determines a probability score for each online login identification. The probability score is a score indicating a probability that such online login identification has a new transaction during the prediction time period 136 (i.e., the time since the last successful retrieval data retrieval time). A probability score is determined by inputting the respective determination of whether there was a new transaction in each of the plurality of data time periods for each respective online login identification into the trained predictive model assigned to the online login identification. In other words, the labeled data set for each respective login identification is input into the trained predictive model assigned to the online login identification. FIG. 13 depicts determining a probability score for the third login identification using the trained third predictive model depicted in FIGS. 7-12.

Figure 14:
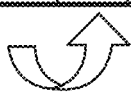
FIG. 14 is a table illustrating the results of determining the probability scores of a plurality of login identifications, according to one embodiment of the present invention.
Figure 15:
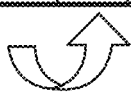
FIG. 15 is a table illustrating a list of the login identifications sorted based on the probability scores from higher probability of having a new transaction since the last successful retrieval time to lower probability of having a new transaction since the last successful retrieval time, according to one embodiment of the present invention.

At step 310, the probability scores for each of the login identifications is used to prioritize the online login identifications for refreshing the financial data. For example, the login identification may be sorted in order of probability scores from highest probability of having a new transaction to lowest probability of having a new transaction during the prediction period 136 (i.e., since the last successful retrieval data retrieval time). FIG. 14 illustrates a table of login identifications and respective probability scores assigned to each login identification. FIG. 15 shows a table of the same login identification sorted from highest probability of having a new transaction to lowest probability of having a new transaction during the prediction period 136.

At step 312, the financial services system 102 retrieves financial data 104 (i.e., refreshes the data) for a plurality of the login identifications from the financial institutions 110 via the communication network 112*a* in the sorted order of the probability scores. Accordingly, those login identifications having the highest probability of having new transactions are refreshed first, and those with lower probabilities are sorted later. Hence, if a financial institution restricts traffic for pulling data, the login identifications most likely to have new transactions will be refreshed, while those less likely to have new transactions may not be refreshed.

Step 312 may be configured to only refresh a predetermined range of the login identifications, such as only the 40%, 30%, 25%, 20% or 15% of the login identifications with the highest probability scores. Alternatively, or in combination with being limited to a range of login identifications, step 312 may be configured to utilize no more than a predetermined amount of network bandwidth and/or data throughput. The predetermined range may be determined by analyzing empirical data, and a business determination of the percentage of login identifications desired to be kept refreshed at any given time, such as using a graph similar to the one shown in FIG. 16.

Figure 16:
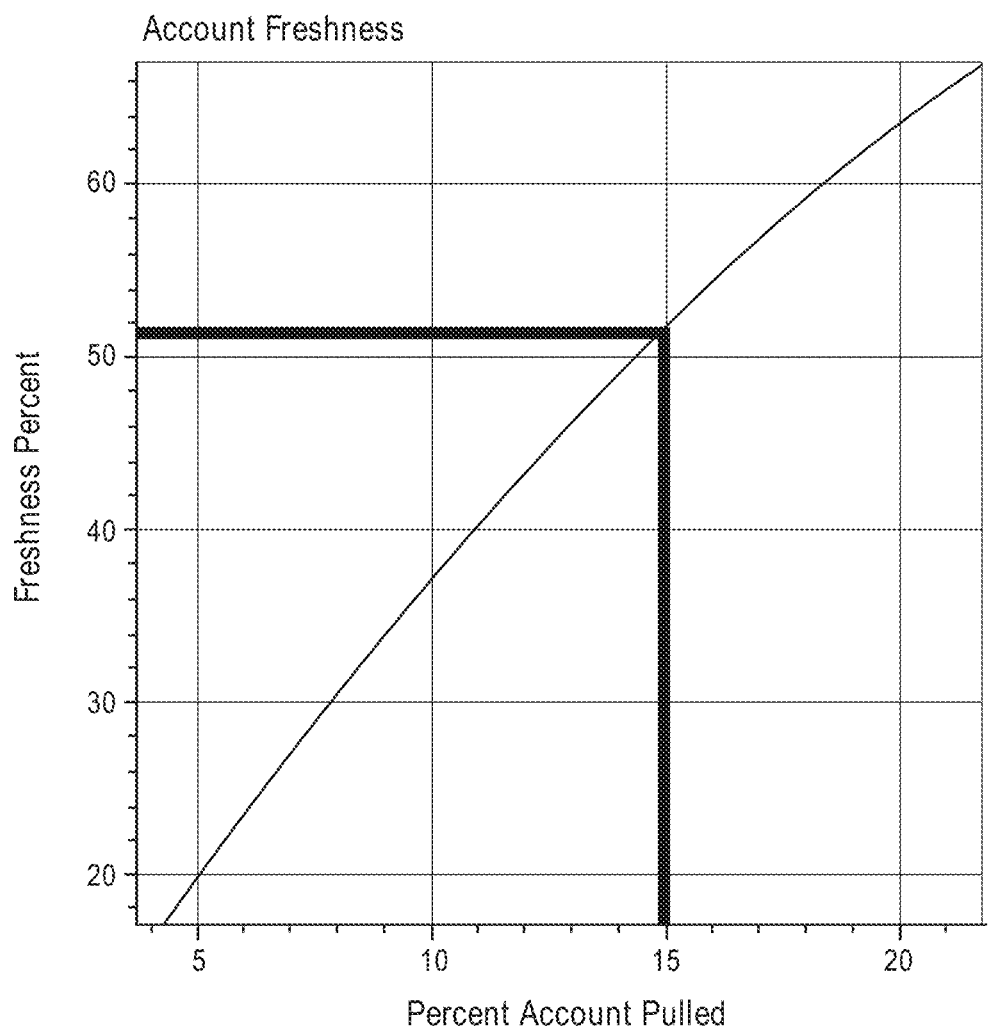
FIG. 16 is a graph illustrating an estimate of percentage of login identifications which are currently refreshed as a function of the percentage of login identifications refreshed during each batch data pull performed using the systems and methods for efficiently performing a batch data pull to retrieve financial data of the present invention.

Turning to FIG. 16, a graph shows an estimate of the percentage of login identifications having current and up-to-date financial data as a function of the percentage of login identifications included in each batch data pull (i.e., each batched financial data retrieval) using the prioritization method of the present invention with test data. It can be seen on the graph that by doing a batch data pull of only 15% of the login identifications in the prioritized order according to the present invention, more than 50% of all of the login identifications will be current and up-to-date following the prioritized batch data pull. This compares to batch pulling the login identification in a random order in which it is predicted that only 10%-15% of the login identification will be current and up-to-date following the random batch data pull.

The methods 400, as well as any other method embodiments described herein, may also be embodied in, or readable from, a computer-readable medium (computer program carrier), e.g., one or more of the fixed and/or removable data storage data devices and/or data communications devices connected to a computer. The computer program carrier is readable by a computer and embodies instructions executable by the computer to perform the method steps of programming a computer to perform the method 400, or any other method embodiments described herein. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, and DVD-RW.

Although particular embodiments have been shown and described, it is to be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. Accordingly, embodiments are intended to exemplify alternatives, modifications, and equivalents that may fall within the scope of the claims.

For example, while multiple embodiments and variations of the many aspects of the invention have been disclosed and described herein, such disclosure is provided for purposes of illustration only. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process as well as performed sequentially. Thus, the methods shown in FIGS. 1 and 2 are not intended to be limited to a particular sequential order, unless otherwise stated or required.

Accordingly, embodiments are intended to exemplify alternatives, modifications, and equivalents that may fall within the scope of the claims.

What is claimed is:

1. A computer-implemented method for retrieving financial data for financial accounts of users via a communication network using each user's online login identifications for the financial accounts, comprising:
   storing a plurality of online login identifications for financial accounts for a plurality of users in a database;
   determining a last successful data retrieval time for each online login identification in which financial data was successfully retrieved for the respective online login identification;
   training a plurality of predictive models, wherein each predictive model is associated with a different model selection time period, said training comprising:
   a. assigning each online login identification to a respective predictive model having a last successful data retrieval time corresponding to the model selection time period associated with the predictive model;
   b. for each of the plurality of predictive models,
      i. accessing financial data for each of the online login identifications assigned to the respective predictive model for a plurality of data time periods prior to the last successful data retrieval time;
      ii. generating a respective model training set of data by determining whether there was a new transaction in each of the plurality of data time periods for each respective online login identification assigned to the respective predictive model using the financial data;
      iii. training the respective predictive model by inputting the respective model training set into a respective learning algorithm for the respective predictive model;
   for each online login identification, determining a probability score that such online login identification has a new transaction since the last successful data retrieval time by inputting the respective determination of whether there was a new transaction in each of the plurality of data time periods for each respective online login identification into the trained predictive model assigned to the online login identification;
   retrieving data for a plurality of the online login identifications via an online connection in an order of the probability scores from higher probability of having a new transaction to lower probability of having a new transaction since the last successful data retrieval time.

2. The method of claim 1, further comprising:
   sorting the online login identifications based on the probability scores from higher probability of having a new transaction to lower probability of having a new transaction since the last successful data retrieval time; and
   wherein retrieving data for a plurality of the online login identifications is based on the sorted online login identifications.

3. The method of claim 1, wherein the data time periods are days and the plurality of data time periods is a plurality of consecutive days.

4. The method of claim 3, wherein the plurality of consecutive days is at least 30 days.

5. The method of claim 3, wherein the plurality of consecutive days is at least 90 day.

6. The method of claim 1, wherein the learning algorithms are each random forest machine learning algorithms.

7. The method of claim 1, wherein retrieving data for a plurality of the online login identifications is performed for a predetermined percentage of the online login identifications.

8. The method of claim 7, wherein the predetermined percentage is selected from the group consisting of 90%, 80%, 70%, 60%, 50%, 40%, 30%, 25%, 20% or 15%.

9. The method of claim 7, wherein the predetermined percentage is selected to result in a percentage of login identifications which are current after completing the step of retrieving data for a plurality of the online login identifications of at least 70%.

10. A system for retrieving financial data for a plurality of financial accounts, comprising
 a computer server having a computer processor, a data store storing financial data for a plurality of financial accounts for a plurality of users and a plurality of online login identifications for the financial accounts for the users, a network communication interface, and a financial data retrieval software application, the computer server in communication with a plurality of financial institutions via a communication network;
 the financial data retrieval software application configured to program the computer to perform the following process:
  determining a last successful data retrieval time for each online login identification in which financial data was successfully retrieved for the respective online login identification;
  training a plurality of predictive models, wherein each predictive model is associated with a different model selection time period said training comprising:
   a. assigning each online login identification to a respective predictive model having a last successful data retrieval time corresponding to the model selection time period associated with the predictive model;
   b. for each of the plurality of predictive models,
    i. accessing financial data for each of the online login identifications assigned to the respective predictive model for a plurality of data time periods prior to the last successful data retrieval time;
    ii. generating a respective model training set of data by determining whether there was a new transaction in each of the plurality of data time periods for each respective online login identification assigned to the respective predictive model using the financial data;
    iii. training the respective predictive model by inputting the respective model training set into a respective learning algorithm for the respective predictive model;
  for each online login identification, determining a probability score that such online login identification has a new transaction since the last successful data retrieval time by inputting the respective determination of whether there was a new transaction in each of the plurality of data time periods for each respective online login identification into the trained predictive model assigned to the online login identification;
  retrieving data for a plurality of the online login identifications via an online connection in an order of the probability scores from higher probability of having a new transaction to lower probability of having a new transaction since the last successful data retrieval time.

11. The system of claim 10, wherein the process training a plurality of predictive models further comprises:
 sorting the online login identifications from higher probability based on the probability scores from higher probability of having a new transaction to lower probability of having a new transaction since the last successful data retrieval time; and
 wherein retrieving data for a plurality of the online login identifications is based on the sorted online login identifications.

12. The system of claim 10, wherein the data time periods are days and the plurality of data time periods is a plurality of consecutive days.

13. The system of claim 12, wherein the plurality of consecutive days is at least 30 days.

14. The system of claim 10, wherein the plurality of consecutive days is at least 90 days.

15. The system of claim 10, wherein the learning algorithms are each random forest machine learning algorithms.

16. The system of claim 10, wherein retrieving data for a plurality of the online login identifications is performed for a predetermined percentage of the online login identifications.

17. The system of claim 16, wherein the predetermined percentage is selected from the group consisting of 90%, 80%, 70%, 60%, 50%, 40%, 30%, 25%, 20% or 15%.

18. The system of claim 16, wherein the predetermined percentage is selected to result in a percentage of login identifications which are current after completing the step of retrieving data for a plurality of the online login identifications of at 70%.

* * * * *